(12) United States Patent
Ange

(10) Patent No.: US 6,234,496 B1
(45) Date of Patent: May 22, 2001

(54) DIRECTIONAL BRAKING TRANSPORT ASSEMBLY

(76) Inventor: Marvin Mitchell Ange, 1838 E. Elmwood, Mesa, AZ (US) 85203

(*) Notice: Subject to any disclaimer, the term of this patent is extended or adjusted under 35 U.S.C. 154(b) by 0 days.

(21) Appl. No.: 09/328,993

(22) Filed: Jun. 10, 1999

(51) Int. Cl.[7] .................................................. B62B 1/00
(52) U.S. Cl. ................................. 280/47.2; 280/33.994
(58) Field of Search ............................. 280/47.2, 47.24, 280/47.27, 47.29, 33.994; 188/19, 21, 22, 1.12, 69, 31

(56) References Cited

U.S. PATENT DOCUMENTS

| | | | |
|---|---|---|---|
| 3,937,479 | * | 2/1976 | Dalton ........................................ 280/3 |
| 4,799,697 | * | 1/1989 | Williamson et al. ..................... 280/3 |
| 5,277,436 | * | 1/1994 | Frank et al. ........................... 280/5.2 |

* cited by examiner

Primary Examiner—Brian L. Johnson
Assistant Examiner—G Klebe

(57) ABSTRACT

A transporting apparatus with directional braking is provided including a frame and a pair of wheel assemblies at least one of which includes a wheel with a plurality of teeth formed therein. Also included is a pawl assembly pivotally coupled with respect to the frame and having a pair of ends for engaging the teeth of the wheel when the pawl assembly is in a first orientation to allow only forward movement of the wheel of the wheel assembly. The pawl further serves to engage the teeth of the wheel when the pawl assembly is in a second orientation to allow only rearward movement of the wheel of the wheel assembly. Finally, the teeth of the wheel are disengaged when the pawl assembly is in an intermediate third orientation to allow both forward and rearward movement of the wheel of the wheel assembly.

6 Claims, 3 Drawing Sheets

DIRECTIONAL BRAKING TRANSPORT ASSEMBLY

BACKGROUND OF THE INVENTION

1. Field of the Invention

The present invention relates to dollies and more particularly pertains to a new directional braking transport assembly for safely transporting heavy loads up and down steep inclines.

2. Description of the Prior Art

The use of dollies is known in the prior art. More specifically, dollies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,388,672; U.S. Pat. No. 4,867,282; U.S. Pat. No. 4,934,490; U.S. Pat. No. 5,277,436; U.S. Patent Des. 301,157; and U.S. Pat. No. 5,197,750.

In these respects, the directional braking transport assembly according to the present invention substantially departs from the conventional concepts and designs of the prior art, and in so doing provides an apparatus primarily developed for the purpose of transporting heavy loads up and down steep inclines.

SUMMARY OF THE INVENTION

In view of the foregoing disadvantages inherent in the known types of dollies now present in the prior art, the present invention provides a new directional braking transport assembly construction wherein the same can be utilized for transporting heavy loads up and down steep inclines.

The general purpose of the present invention, which will be described subsequently in greater detail, is to provide a new directional braking transport assembly apparatus and method which has many of the advantages of the dollies mentioned heretofore and many novel features that result in a new directional braking transport assembly which is not anticipated, rendered obvious, suggested, or even implied by any of the prior art dollies, either alone or in any combination thereof.

To attain this, the present invention generally comprises a frame including a substantially planar rectangular bottom plate, a pair of handle posts coupled to a rear edge of the plate adjacent to opposite side edges thereof and extending upwardly therefrom in perpendicular relationship therewith, an axle perpendicularly coupled between lower portions of the posts of the frame adjacent to and spaced from the bottom plate, wherein ends of the axle extend past the handle posts; and a pair of wheel assemblies each including a fixed housing having a substantially planar circular inner plate fixedly coupled to the axle between one of the posts and one of the ends of the axle, an annular peripheral lip coupled to a periphery of the inner plate and extending outwardly therefrom for defining an interior space, and a rectangular cut out formed in the peripheral lip adjacent to and to the rear of an apex thereof, a wheel including a substantially planar circular outer plate with a diameter equal to that of the inner plate of the housing and rotatably coupled to one of the ends of the axle, a side wall coupled to a periphery of the outer plate and extending inwardly therefrom for rotatably engaging the peripheral lip of the housing, a tire coupled to an outer surface of the side wall with a diameter greater than that of the housing, and a plurality of teeth formed in an inner surface of the side wall, and a pawl assembly including a lever with a substantially planar rectangular inboard portion hingably coupled at a central extent thereof about a horizontal axis within the cut out formed in the peripheral lip of the housing and a substantially planar rectangular outboard portion extending outwardly and downwardly with respect to the inboard portion for defining an obtuse angle therewith, an arm coupled at a first end thereof to an inboard end of the inboard portion of the lever and extending into the wheel in parallel relationship with the axle of the frame, and a pawl coupled at a central extent thereof to a second end of the arm, the pawl having a pair of beveled ends for engaging the teeth of the wheel when the lever is in a first orientation to allow only forward movement of the wheel of the wheel assembly, engaging the teeth of the wheel when the lever is in a second orientation to allow only rearward movement of the wheel of the wheel assembly, and disengaging the teeth of the wheel when the lever is in an intermediate third orientation to allow both forward and rearward movement of the wheel of the wheel assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new directional braking transport assembly apparatus and method which has many of the advantages of the dollies mentioned heretofore and many novel features that result in a new directional braking transport assembly which is not anticipated, rendered obvious, suggested, or even implied by any of the prior art dollies, either alone or in any combination thereof.

It is another object of the present invention to provide a new directional braking transport assembly which may be easily and efficiently manufactured and marketed.

It is a further object of the present invention to provide a new directional braking transport assembly which is of a durable and reliable construction.

An even further object of the present invention is to provide a new directional braking transport assembly which is susceptible of a low cost of manufacture with regard to both materials and labor, and which accordingly is then susceptible of low prices of sale to the consuming public, thereby making such directional braking transport assembly economically available to the buying public.

Still yet another object of the present invention is to provide a new directional braking transport assembly which provides in the apparatuses and methods of the prior art some of the advantages thereof, while simultaneously overcoming some of the disadvantages normally associated therewith.

Still another object of the present invention is to provide a new directional braking transport assembly for transporting heavy loads up and down steep inclines.

Even still another object of the present invention is to provide a new directional braking transport assembly that includes a frame and a pair of wheel assemblies at least one of which includes a wheel with a plurality of teeth formed therein. Also included is a pawl assembly pivotally coupled with respect to the frame and having a pair of ends for engaging the teeth of the wheel when the pawl assembly is in a first orientation to allow only forward movement of the wheel of the wheel assembly. The pawl further serves to engage the teeth of the wheel when the pawl assembly is in a second orientation to allow only rearward movement of the wheel of the wheel assembly. Finally, the teeth of the wheel are disengaged when the pawl assembly is in an intermediate third orientation to allow both forward and rearward movement of the wheel of the wheel assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
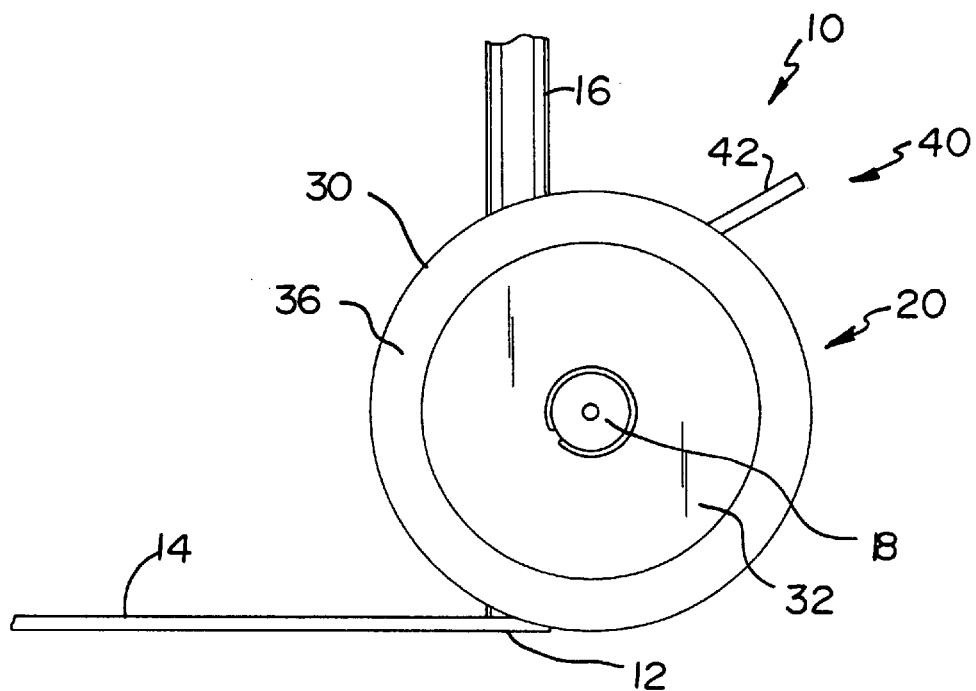
FIG. 1 is a side view of a new directional braking transport assembly according to the present invention.

With reference now to the drawings, and in particular to FIGS. 1 through 5 thereof, a new directional braking transport assembly embodying the principles and concepts of the present invention and generally designated by the reference numeral 10 will be described.

Figure 2:
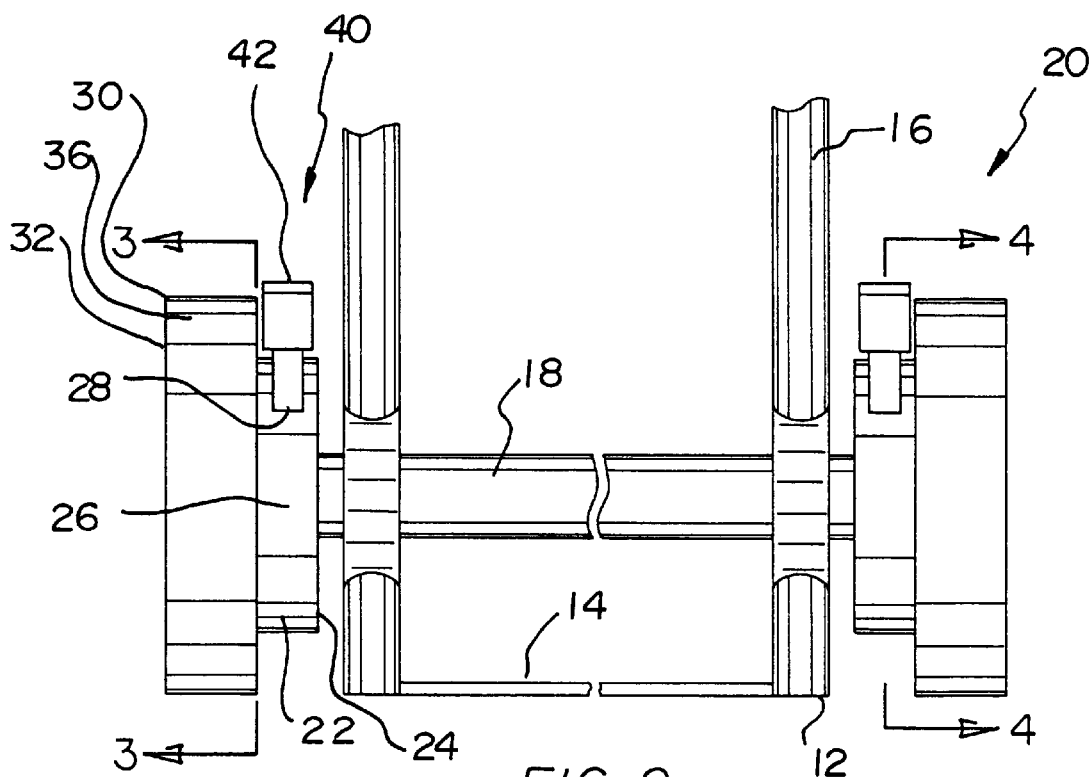
FIG. 2 is a rear view of the present invention.

The present invention, designated as numeral 10, includes a frame 12 having a substantially planar rectangular bottom plate 14. Further included is a pair of handle posts 16 coupled to a rear edge of the plate adjacent to opposite side edges thereof. As shown in FIGS. 1 & 2, the handle posts extend upwardly from the bottom plate in perpendicular relationship therewith. An axle 18 is perpendicularly and fixedly coupled between lower portions of the posts of the frame adjacent to and spaced from the bottom plate. For reasons that will soon become apparent, ends of the axle extend past the handle posts.

Figure 4:
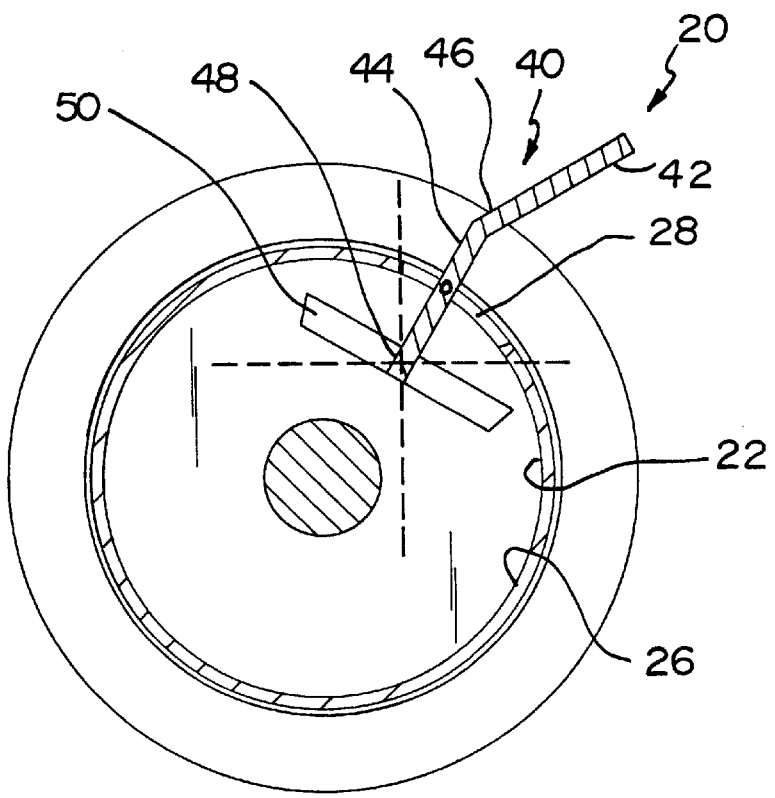
FIG. 4 is a cross-sectional view of the fixed housing of one of the wheel assemblies of the present invention taken along line 4—4 shown in FIG. 2.

Also included is a pair of wheel assemblies 20 each including a plurality of components. As shown in FIGS. 2 & 4, such components first include a fixed housing 22 having a substantially planar circular inner plate 24 fixedly coupled to the axle between one of the posts and one of the ends of the axle. Further, an annular peripheral lip 26 is coupled to a periphery of the inner plate and extends outwardly therefrom for defining an interior space. A rectangular cut out 28 is formed in the peripheral lip adjacent to and to the rear of an apex thereof.

Each of the wheel assemblies further includes a wheel 30 including a substantially planar circular outer plate 32 with a diameter equal to that of the inner plate of the housing. Such outer plate is rotatably coupled to one of the ends of the axle via bearings or the like. Coupled to a periphery of the outer plate is a side wall 34 which extends inwardly therefrom for rotatably engaging the peripheral lip of the housing. This may be accomplished by way of bearings or the like. A tire 36 is coupled to an outer surface of the side wall with a diameter greater than that of the housing. Lastly, a plurality of teeth 38 are formed around a complete circumference of an inner surface of the side wall. Note FIG. 3.

Figure 3:
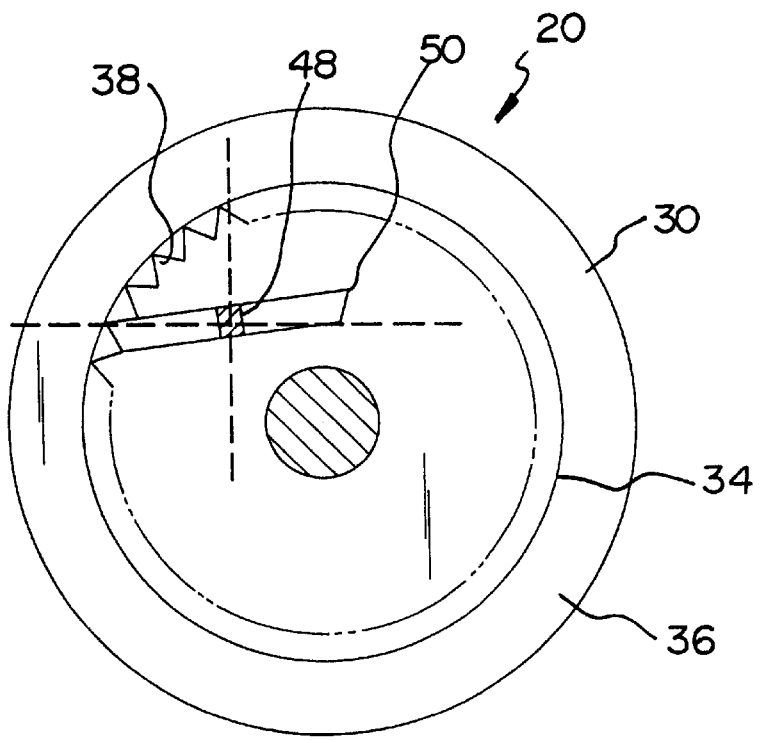
FIG. 3 is a cross-sectional view of the wheel of one of the wheel assemblies of the present invention taken along line 3—3 shown in FIG. 2.

With reference now to FIGS. 2–4, a pawl assembly 40 is provided including a lever 42 with a substantially planar rectangular inboard portion 44 hingably coupled at a central extent thereof about a horizontal axis within the cut out formed in the peripheral lip of the housing. Such lever is further equipped with a substantially planar rectangular outboard portion 46 extending outwardly and downwardly with respect to the inboard portion for defining an obtuse angle therewith. An arm 48 is fixedly coupled at a first end thereof to an inboard end of the inboard portion of the lever and extends into the wheel in parallel relationship with the axle of the frame. As shown in FIG. 4, a pawl 50 is fixedly coupled at a central extent thereof to a second end of the arm. Such pawl has a pair of beveled ends for selectively engaging the teeth of the wheel.

In use, the pawl is adapted for engaging the teeth of the wheel when the lever is in a first orientation to allow only forward movement of the wheel of the wheel assembly. The pawl further engages the teeth of the wheel when the lever is in a second orientation to allow only rearward movement of the wheel of the wheel assembly. Finally, the pawl disengages the teeth of the wheel when the lever is in an intermediate third orientation. As such, both forward and rearward movement of the wheel of the wheel assembly is allowed.

It should be noted that the inner plate of the housing may have a resilient metallic strip with three undulations formed therein. Further, the lever of the pawl assembly may be equipped with a protrusion for being urged between the undulations, whereby the pawl of the pawl assembly is urged against the teeth of the wheel when in the first and second orientations. Optionally, any other method of accomplishing the foregoing objective may be employed.

Figure 5:
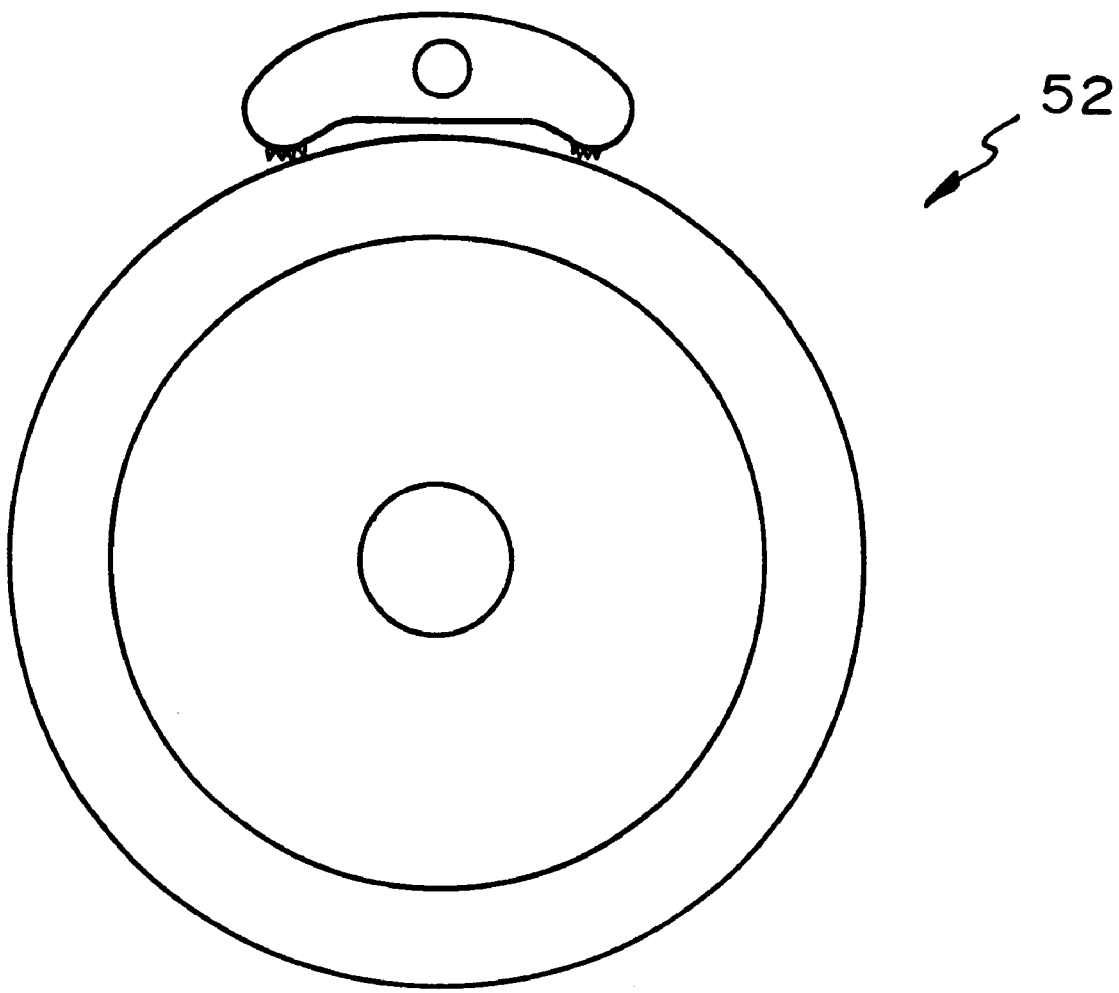
FIG. 5 is a side view of a retrofittable optional embodiment of the present invention.

In an optional embodiment 52, a pawl may simply be retrofitted to the frame of an existing dolly or similar apparatus. As shown in FIG. 5, such pawl may be adapted to engage teeth in an outer surface of the wheel for carrying out the directional braking.

Use of the inventive apparatus on dollies is most highly preferred because of the relatively simple and highly compact nature of the apparatus permitted by the features of the invention. It will be understood by those skilled in the art that aspects of the present invention may be suitably employed on other wheeled devices such as, for example, wheelchairs.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dolly apparatus with directional braking comprising, in combination:
    a frame including a substantially planar rectangular bottom plate, a pair of handle posts coupled to a rear edge of the plate adjacent to opposite side edges thereof and extending upwardly therefrom in perpendicular relationship therewith, an axle perpendicularly coupled between lower portions of the posts of the frame adjacent to and spaced from the bottom plate, wherein ends of the axle extend past the handle posts; and
    a pair of wheel assemblies each including:
        a fixed housing having a substantially planar circular inner plate fixedly coupled to the axle between one of the posts and one of the ends of the axle, an annular peripheral lip coupled to a periphery of the inner plate and extending outwardly therefrom for defining an interior space, and a rectangular cut out formed in the peripheral lip adjacent to and to the rear of an apex thereof,
        a wheel including a substantially planar circular outer plate with a diameter equal to that of the inner plate of the housing and rotatably coupled to one of the ends of the axle, a side wall coupled to a periphery of the outer plate and extending inwardly therefrom for rotatably engaging the peripheral lip of the housing, a tire coupled to an outer surface of the side wall with a diameter greater than that of the housing, and a plurality of teeth formed in an inner surface of the side wall, and
        a pawl assembly including a lever with a substantially planar rectangular inboard portion hingably coupled at a central extent thereof about a horizontal axis within the cut out formed in the peripheral lip of the housing and a substantially planar rectangular outboard portion extending outwardly and downwardly with respect to the inboard portion for defining an obtuse angle therewith, an arm coupled at a first end thereof to an inboard end of the inboard portion of the lever and extending into the wheel in parallel relationship with the axle of the frame, and a pawl coupled at a central extent thereof to a second end of the arm, the pawl having a pair of beveled ends for engaging the teeth of the wheel when the lever is in a first orientation to allow only forward movement of the wheel of the wheel assembly, engaging the teeth of the wheel when the lever is in a second orientation to allow only rearward movement of the wheel of the wheel assembly, and disengaging the teeth of the wheel when the lever is in an intermediate third orientation to allow both forward and rearward movement of the wheel of the wheel assembly.

2. A transporting apparatus with directional braking comprising:
    a frame; and
    a pair of wheel assemblies at least one of which including:
        a fixed housing having an inner plate fixedly coupled to the frame, an annular peripheral lip coupled to a periphery of the inner plate and extending outwardly therefrom for defining an interior space, and a rectangular cut out formed in the peripheral lip adjacent the rear of an apex thereof;
        a wheel with a plurality of teeth formed therein, and
        a pawl assembly pivotally coupled with respect to the cut out of the fixed housing and having a pair of ends for engaging the teeth of the wheel when the pawl assembly is in a first orientation to allow only forward movement of the wheel of the wheel assembly, engaging the teeth of the wheel when the pawl assembly is in a second orientation to allow only rearward movement of the wheel of the wheel assembly, and disengaging the teeth of the wheel when the pawl assembly is in a third orientation to allow both forward and rearward movement of the wheel of the wheel assembly.

3. A transporting apparatus as set forth in claim 2 wherein the pawl assembly includes a lever for manually adjusting the pawl assembly.

4. A transporting apparatus as set forth in claim 2 wherein the apparatus is a dolly.

5. A transporting apparatus as set forth in claim 2 wherein the pawl assembly is coupled to the frame.

6. A dolly apparatus with directional braking comprising:
    a frame including a bottom plate, a pair of handle posts coupled to a rear edge of the plate adjacent to opposite side edges thereof, an axle coupled between lower portions of the posts of the frame adjacent to and spaced from the bottom plate, wherein ends of the axle extend past the handle posts; and
    a pair of wheel assemblies each including:
        a housing having an inner plate fixedly coupled to the axle between one of the posts and one of the ends of the axle, a peripheral lip coupled to a periphery of the inner plate and extending outwardly therefrom for defining an interior space, and a cut out formed in the peripheral lip,
        a wheel including an outer plate rotatably coupled to the axle, a side wall being coupled to a periphery of the outer plate and extending inwardly therefrom for rotatably engaging the peripheral lip of the housing, a plurality of teeth formed in an inner surface of the side wall, and a pawl assembly including a lever with an inboard portion pivotally extending through the cut out formed in the peripheral lip of the housing, an outboard portion of the lever extending outwardly and downwardly with respect to the inboard portion, an arm coupled at a first end thereof to an inboard end of the inboard portion of the lever and extending into the wheel, and a pawl coupled at a central extent thereof to a second end of the arm, the pawl having a pair of ends, a first one of the ends of the pawl engaging the teeth of the wheel when the lever is in a first orientation to allow only forward movement of the wheel of the wheel assembly, a second on of the ends of the pawl engaging the teeth of the wheel when the lever is in a second orientation to allow only rearward movement of the wheel of the wheel assembly, and the ends of the pawl being disengaged from the teeth of the wheel when the lever is in an intermediate third orientation to allow both forward and rearward movement of the wheel of the wheel assembly.

* * * * *